United States Patent [19]
Hepworth

[11] Patent Number: 6,058,606
[45] Date of Patent: May 9, 2000

[54] APPARATUS FOR CUTTING OR STRIPPING CABLES

[75] Inventor: Paul Steabben Hepworth, Guildford, United Kingdom

[73] Assignee: Plasplugs, Inc., Lakewood, N.J.

[21] Appl. No.: 09/054,824

[22] Filed: Apr. 3, 1998

[30] Foreign Application Priority Data

Apr. 9, 1997 [GB] United Kingdom .................... 9707211

[51] Int. Cl.$^7$ ...................................... B21F 13/00
[52] U.S. Cl. ............................................. 30/90.1; 30/91.2
[58] Field of Search .................... 30/90.1, 91.2; 81/9.4, 9.44, 9.42, 9.43

[56] References Cited

U.S. PATENT DOCUMENTS

| 2,995,052 | 8/1961 | Funcik ...................................... 30/90.1 |
| 3,257,722 | 6/1966 | Caine ....................................... 30/90.1 |
| 3,881,249 | 5/1975 | Cox, Jr. .................................... 30/90.7 |
| 4,070,930 | 1/1978 | Oprins ...................................... 30/90.6 |
| 4,366,619 | 1/1983 | Bieganski ................................. 30/90.1 |
| 4,426,778 | 1/1984 | Christie .................................... 30/90.1 |
| 4,805,302 | 2/1989 | Steiner ..................................... 30/90.1 |
| 4,829,671 | 5/1989 | Cheng ...................................... 30/90.1 |
| 5,009,130 | 4/1991 | Bieganski ............................ 30/90.1 X |
| 5,036,734 | 8/1991 | Morrow ................................... 81/9.44 |
| 5,398,413 | 3/1995 | Chen ........................................ 30/90.1 |

FOREIGN PATENT DOCUMENTS

| 2220678 | 1/1973 | Germany ................................. 30/90.1 |
| 3214208 | 10/1983 | Germany ................................. 30/90.1 |
| 195 43 390 C1 | 1/1997 | Germany . |
| 2231732 | 11/1990 | United Kingdom .................... 30/90.1 |

Primary Examiner—M. Rachuba
Attorney, Agent, or Firm—Michaelson & Wallace; Peter L. Michaelson

[57] ABSTRACT

A device for use with a cable including a body having an opening to receive the cable. A cutting element is movable within the body between a first position and a second position. When the cutting element is in the first position, the cutting element does not extend into the opening such that the cable may be displaced into the opening. When the cutting element is displaced into a second position, the cutting element extends into the opening by an adjustable amount such as to engage a cable positioned within the opening. A manually operable adjustment device adjusts the amount that the cutting element extends into the opening when the cutting element is positioned in the second position. The manually operable adjustment device includes a further member that secures the cutting element and allows for motion of the cutting element in a direction towards and away from the center of the opening between the first position and the second position. The manually operable adjustment device also includes a manually-operable, non-rotatable, slidable member that when slid, adjusts travel of the further member in the direction. The adjustment of travel of the further member, in turn, adjusts the amount that the cutting element extends into the opening when the cutting element is positioned in the second position, thereby adjusting the maximum cut depth into the cable by the cutting element.

27 Claims, 4 Drawing Sheets

APPARATUS FOR CUTTING OR STRIPPING CABLES

FIELD OF THE INVENTION

This invention relates to a hand tool for use with cable, principally electrical/electronic/optical cable, and particularly provides means for cutting such cable and/or for stripping off sleeving from conductors thereof. The cable may, for example, be that conventionally used with domestic appliances, having a relatively thick outer sleeve enclosing two or three inner conductors with thinner sleeves respectively, or it may be in the form of co-axial computer cable with a relatively thin outer sleeve. The tool can also be used to strip single wires, and to twist multi-strand wires for insertion into plug terminals.

SUMMARY OF THE INVENTION

According to one embodiment of the invention a hand tool for use with a cable comprises a body having an opening to receive said cable, and a cutting element movable within the body between a first position, where it is clear of the opening, to allow reception of said cable into said opening, and a second position, where it engages the received cable so that at least upon relative angular movement between the engaged cable and the cutting element, if not directly on engagement of the cutting element with the cable, a cut is produced in or through the cable.

As used herein, the term 'cable' includes an individual core in a multi-core cable, as well as the complete cable made up of one or more of such cores each within an outer sleeve. Each core may be formed with an individual sleeve around a conductor or may be merely a conductor, projecting from an enveloping outer sleeve. The term 'cable', as used herein, also includes wires, cords and flexes, as well as cable itself.

Preferably the hand tool includes means for adjusting the maximum depth of cut possible, i.e. cutting depth, between the cable and said cutting element. This allows the maximum depth of cut into the cable to be adapted as required for different thicknesses of cable sleeves, and also thus allows the cable to be stripped rather than completely severed.

Desirably the cutting element is pivotally movable within the body, and conveniently the cutting element is biased to its second position. Advantageously the depth of cut in the cable is adjustable by operation of a manually slidable member which controls adjustment movement of an anvil member so as to uncover a greater or lesser amount of the cutting element. More preferably there is provided pressure relief means for relieving biasing/cutting force on an inserted cable/core.

According to another aspect of one embodiment of the invention a hand tool for use with electric/electronic cable comprises means for adjusting the depth of cut produced in such a cable in use.

BRIEF DESCRIPTION OF THE DRAWINGS

The invention will now be described, by way of example, with reference to the accompanying drawings, in which.

DETAILED DESCRIPTION OF THE PRESENT INVENTION

The hand tool of the present invention is for use with electrical flex or cable, both for cutting such cable and also for stripping insulating/shielding sleeving from the cable or from electrical conductors or cores forming the interior of the cable. It can also be used to twist multi-strand wires for insertion into plug terminals.

General Structure of the Hand Tool

The hand tool, as shown assembled in FIGS. 5–7, 23–27 and 33, has a body made up of a first body part 10 and a second body part 11 which are generally similarly peripherally shaped and which are arranged to interfit together so that the first body part 10 forms the front and sides of the hand tool, whilst the second body part 11 forms the rear of the tool. Pivotally mounted at the body is a cutting blade holder 12 which normally lies partly within the body and is movable further into the body when cable is to be inserted through it for being operated on by the cutting blade 13 of the cutting blade holder 12. The cutting blade holder is biased to its outer position relative to the body by means of a blade spring 14, the blade spring has one end anchored in the body and the other end bearing on the holder 12. Certain embodiments of the invention also incorporate a feature namely that the depth of cut is adjustable for different types of cable. To achieve these results, the cutting blade holder 12 carries a movable anvil member 15, the movement of which is controlled by a slidable operating button 16 which, in the normal outwardly biased position of the cutting blade holder 12, is capable of manual sliding movement so as to adjust the position of the anvil relative to the cutting blade 13 and thus alter the depth of cut. Both of the first and second body parts and also the cutting blade holder would normally be injection moulded in plastics material, such as ABS or polyamide. Similarly the anvil member and the operating button would also normally be injection moulded.

Figure 1:
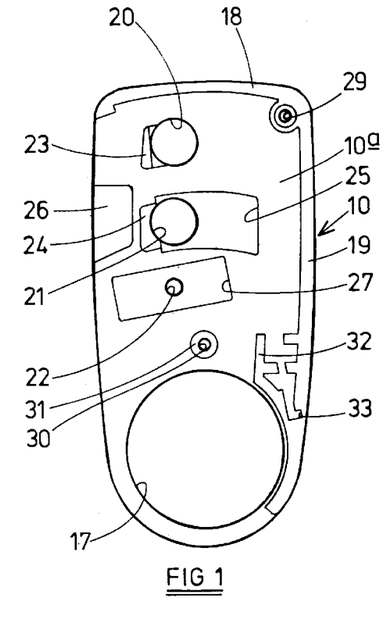
FIGS. 1 to 4 are an interior plan view, an exterior plan view, and opposite side views respectively of part of a body of a hand tool of one embodiment of the present invention.

As can be seen from FIGS. 1 to 4, the first body part 10 is of generally rounded rectangular form, but is tapered from its one end towards its opposite end which is formed with a part cylindrical shape around a circular hole 17 through the part 10. As mentioned, the body part 10 provides both one side of the hand tool body and also a side thereof, this side being formed by upstanding walls 18, 19 respectively extending around two sides of the main body portion 10a of the part 10, as shown in FIG. 1. The wall 19 extends around part of the cylindrical periphery part of the main body portion, but the remainder of the body part 10 is open at its sides for reception of the cutting blade holder 12 as will hereinafter be described.

The interior surface of the main body portion 10a is generally flat, but is provided with various through holes, recesses, slots and upstanding projections, as will be described. Three through holes 20, 21, 22 are provided through the main body portion 10a, these being to the left of a longitudinal center line through the body part 10, as viewed from the inside, as shown in FIG. 1. The centers of the three holes are colinear, the common line being parallel to said longitudinal centre line of the body part 10. The three holes are spaced apart generally regularly, with the hole 20 nearest the wall 18 having the same diameter as the hole 21 next thereto, with the hole 22, which is nearest the circular hole 17, being of much smaller diameter.

Figure 3:
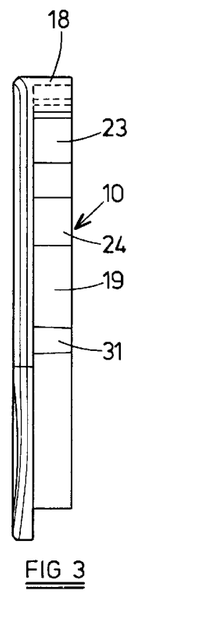
Figure 4:
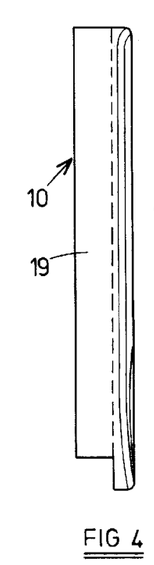

At the side of the hole 20 that is remote from the wall 19 is an upstanding guide projection 23. As shown in FIG. 3, the guide projection extends to the same height as the walls 18 and 19. Similarly at the side of the hole 21 remote from the wall 19 there is a further upstanding guide projection 24. Moreover here the surface of the main body portion 10a extending from this projection 24 towards the wall 19 is formed with a recess 25 which is of generally rectangular form, but which has its longer sides in the form of arcs struck about the center of the hole 17. Accordingly the hole 21 is located in this recess. Additionally at the side of the projection 24 away from the hole 21, there is formed a further, less deep recess 26 which extends to the periphery of the main body portion 10a.

Figure 2:
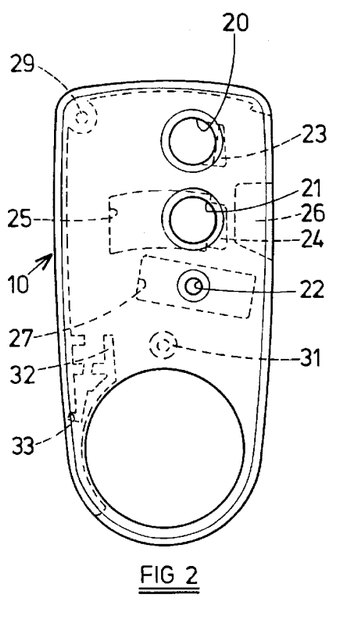
Figure 28:
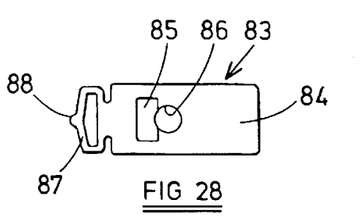
FIGS. 28 to 30 are a top plan view, a side view and a partial side section of an element of a second embodiment of a hand tool of the invention.
Figure 29:
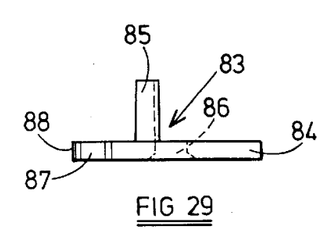
Figure 30:
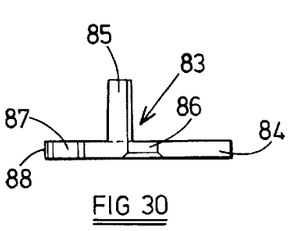

In FIGS. 1 and 2, the hole 22 is shown without an associated upstanding guide projection as with the holes 20, 21, but instead the hole 22 is provided with an associated rectangular recess 27. The hole 22 is disposed in the center longitudinal and lateral center of the rectangular recess 27. The rectangular recess is slightly angled relative to a line perpendicular to the longitudinal centre line of the body part 10. However this recess 27 is intended for use with a pressure relief insert shown in FIGS. 28 to 30 in respect of a second embodiment of the hand tool. With one embodiment of the invention, the recess 27 is omitted and an upstanding guide projection, which is not shown, is disposed at the side of the hole 22 remote from the wall 19 in a similar manner to the projections 23 and 24. It will be noted that all three holes 20, 21, 22 are countersunk at the outer side of the main body portion 10a. To connect the two body parts 10 and 11 together, the body part 10 is provided, as shown, with a screw hole 29 at its one corner defined at the junction of the walls 18 and 19, with a further screw hole 30 being provided in an upstanding spigot 31 arranged on the longitudinal center line of the body part 10 at a position between the hole 22 and the large circular hole 17. This spigot extends to the same height from the inner surface of the main body portion 10a as all three upstanding guide projections referred to around the holes 20, 21 and 22 respectively.

Adjacent the circular hole 17 the wall 19 is formed with an extension part 32 which extends away from the wall 19, the part 32 firstly extending around the circular hole 17 and then extending generally parallel to, but spaced from, the wall 19, in a direction towards the wall 18, but being only of short extent. The space formed between the wall 19 and the extension part 32 is intended to receive the end of the blade spring 14, and for this purpose, part of the wall 19 is formed with an undercut 33 to define a location at the inner end of the space into which a short bent leg portion 34 of the spring is fitted, in use so as to retain the spring in position. The space provides some guiding for the main part of the spring and allows the spring to flex as, in use, the cutting blade holder 12 is moved in and out of the body of the hand tool. It is convenient if a pair of such blade springs, one against the other, are used, with the respective short leg portions thereof both being received in the location provided by the undercut 33.

Figure 5:
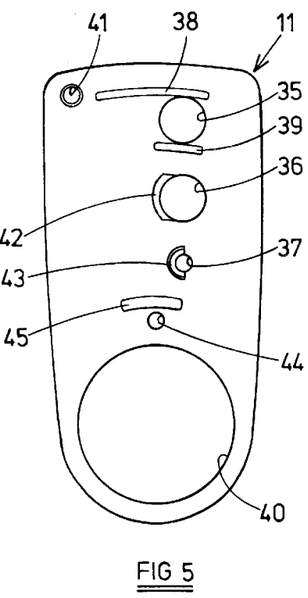
FIGS. 5 to 7 are an interior plan view, an exterior plan view and a side view respectively of another part of the body of the hand tool.
Figure 6:
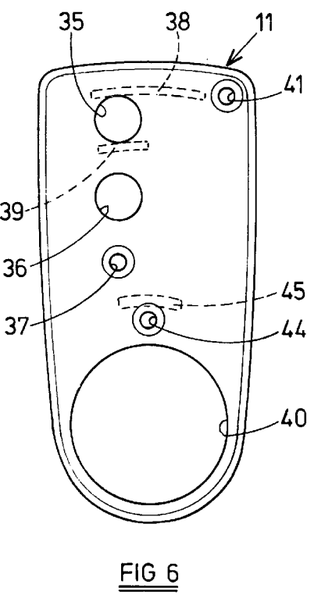
Figure 7:
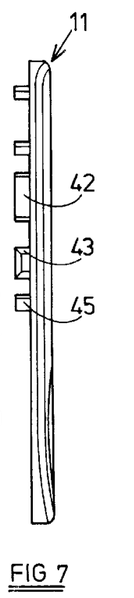

The second body part 11, shown in FIGS. 5 to 7 has the same outer peripheral shape as the first body part 10 so that when fitted together the hand tool has the over all shape of each of the parts 10, 11. Unlike the first body part 10, the second body part 11 has no upstanding walls around any part of its periphery, and thus does not provide any part of the side surface of the hand tool. Its inner surface, shown in FIG. 5, is generally flat, but is provided with various through holes and projections as will be described.

Like the body part 10, this body part 11 has three through holes 35, 36, 37 again of circular shape, corresponding exactly in diameter, and position relative to the longitudinal centre line of the part, to the three through holes 20, 21, 22, so that when the two body parts 10 and 11 are placed together (one over and aligned with the other to form the body of the hand tool), the holes 20 and 35 are exactly aligned, as are the holes 21 and 36, and 22 and 37 respectively.

At opposite sides of the hole 35 the interior surface of the body part 11 is formed with two upstanding guide projections 38, 39 respectively each being of generally arcuate form on arcs struck about the center of the large circular hole 40 which corresponds to the hole 17 and is exactly aligned therewith when the two body parts are connected together. The guide projection 38, which is longer than the guide projection 39 is at the side of the hole 35 adjacent the end of the body part 11 remote from the circular hole 40, while the guide projection 39 is at the opposite side of the hole 35, being disposed generally parallel to the guide 38. Both guides extend alongside the hole for a distance slightly greater than its diameter, with the projection 38 being further extended across both sides of the longitudinal center axis of the part 11, so as to extend generally symmetrically on both sides thereof. Spaced closely to the end of the projection 38 remote from the hole 35, is a through hole 41 which is countersunk at the exterior surface of the body part 11 to receive a fixing screw or the like which passes, in use, into the screw hole 29 in the body part 10.

The hole 36 has an upstanding guide projection 42 at its side adjacent the longitudinal center line of the body part 11, although this could be omitted if desired. Similarly a further upstanding guide projection 43 which is generally semi-cylindrical, is disposed at the side of the hole 37 towards the longitudinal center line of the part 11. Again this could be omitted if desired. The hole 37, but not the holes 35 and 36 can be countersunk, as shown, at the exterior side of the part 11.

Finally between the hole 37 and the large circular hole 40 there is, on the longitudinal center line, a through hole 44 of circular shape which is intended to receive a fixing screw which passes into the hole 30 in the spigot 31 of the body part 10. This hole 44 is preferably countersunk at the external surface of the part 11 as shown in FIG. 6. An upstanding guide projection 45 extends generally symmetrically at opposite sides of the longitudinal center line at the side of the hole 44. The projection, which is spaced a short distance from this hole, is, like the guide projection 38, of arcuate form and is again centred about the axis of the circular hole 40. As can be seen in FIG. 7, all the guide projections are of the same height, this being such that when the two body parts 10 and 11 are connected together, these projections are well clear of the inner surface of the body part 10, whereas in contrast all the upstanding guide projections of the body part 10 engage with or are in juxtaposition to the internal surface of the part 11.

As previously mentioned, the cutting blade holder 12, shown in FIGS. 8 to 13 is movable between a normal position, where it is biased by the blade spring 14 to lie partly out of the body of the hand tool, and an operator actuated position where it is moved more fully into the body so as to 'open' the three through openings defined in the body to allow insertion of cable to be cut or stripped, the three openings being formed by the aligned holes 20 and 35, 21 and 36, and 22 and 37 respectively.

As can be seen from FIGS. 8 to 13, the cutting blade holder has a somewhat similar shape to that of the two body parts, in particular having at its generally narrower end a relatively large circular through hole 46. However rather than merely extending through a main body portion 12a of the holder 12, the hole 46 extends through oppositely directed upper and lower cylindrical extension portions 47, 48 respectively which each extend axially for a distance equal to the axial depth of the holes 17, 40 respectively, so that, in effect, these portions 47, 48 fit in the holes 17, 40 respectively as bearings to allow the cutting blade holder 12 to be pivotally moved within the hand tool body, the thickness of the main body part 12a thus corresponding to the interior space in the hand tool body defined between the body parts 10 and 11 when these are assembled together as described.

Figure 8:
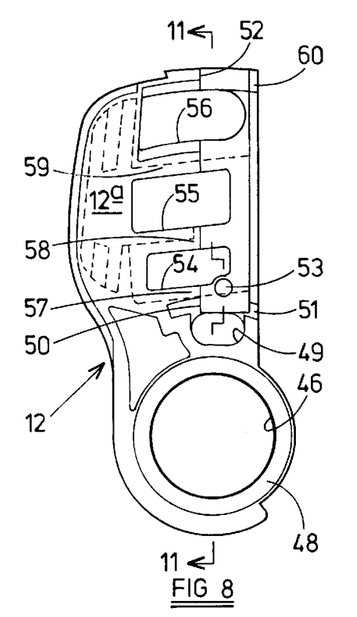
FIGS. 8 to 10 are opposite plan views and a side view respectively of a holder for a cutting blade of the hand tool.

As far as the cutting blade holder 12 is concerned, there will firstly be described its face shown in FIG. 8 which, on assembly, faces the interior surface of the body part 11. Accordingly the surface of the main body portion 12a shown in FIG. 9 faces the interior surface of the body part 10 when this holder is pivotally mounted between said assembled body parts.

As shown in FIG. 8, there is provided an arcuate through slot 49 spaced slightly from the through circular hole 46 in a direction towards the end of the holder remote from said hole 46. On assembly, the spigot 31 which upstands from the interior side of the body part 10 is received in this slot, which is centered about the axis of the through hole 46. At the side of the slot 49 remote from the through hole 46, the surface is formed with an arcuate recess 50, and this extends to a slot 51 in the unrecessed side of this surface of the holder. The arcuate recess 50 and recess and slot 51 receiving, on assembly, the upstanding guide projection 45 of the body part 11, the one end of which engages the closed end of the recess 50 to act as a stop when the blade holder is pushed fully into the hand tool body. A recessed portion at a level below the depth of the recess 50, and between recess 50 and slot 51, is continued along said unrecessed side of the holder shown in FIG. 8, this recessed portion extending through the end of the holder 12 remote from the through hole 46 as a slot 52. Formed in the recessed portion at a position adjacent the open end of the recess 50 next to the slot 49 is an upstanding cylindrical peg 53 which, by way of a corresponding circular section hole in the blade 13 locates the blade which is received in the recessed portion referred to as extending along the unrecessed side of the surface shown in FIG. 8, the end of the blade extending into the slot 52. The blade is a close fit in this recessed portion.

Figure 23:
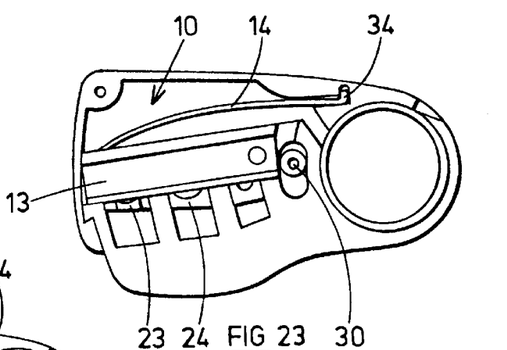
FIG. 23 is a view of the hand tool in an assembled condition, but with the body part of FIGS. 5 to 7 removed, the tool being shown in a state where its cutting blade is biased to cover cable insertion holes of the tool.
Figure 24:
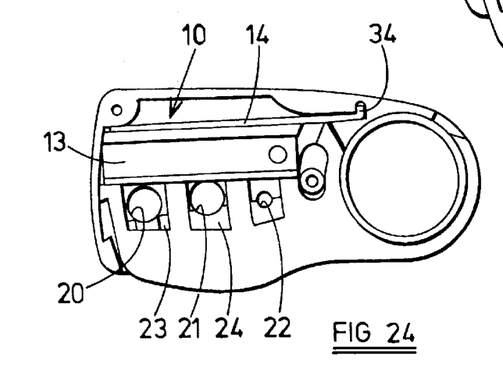
FIG. 24 is the same view as in FIG. 23, but with the cutting blade moved against the bias, to open the holes for cable insertion.

The recessed portion in which the blade is received, on assembly, is extended laterally, to the left as shown in FIG. 8, therefrom at three spaced apart positions and at these positions the recesses are formed with respective generally rectangular through openings 54, 55, 56. Although generally rectangular, the longer sides of each opening are generally struck about an arc centered on the axis of the through hole 46. In each case the opening breaks into the bottom of the recess in which the blade 13 is received on assembly. The recess 50 is separated from the opening 54 by a wall 57, while the openings 54 and 55 are separated by a wall 58, the openings 55 and 56 being separated by a wall 59. The sharpened, cutting edge of the straight blade 13 thus lies, as best shown in FIGS. 23 and 24, against the free ends of the walls 57, 58 and 59. In FIGS. 23 and 24 the slot 52 is not shown, and this is indeed optional. However if it is provided, the sharpened edge of the blade will engage against the side of this slot 52 which is in line with the free ends of the walls 57, 58 and 59 as described.

Finally with regard to the surface shown in FIG. 8, it can be seen that the unrecessed side of the surface previously referred to has, at this junction with the slot 52 a slot 60 therein for receiving therethrough the upstanding guide projection 38 of the body part 11 so that the blade holder can pivot in the body in use. Additionally the opposite longer sides of the opening 56 are slightly built up to provide ledges at the same level as the lower surface of the slot 60 to receive the outward, free surfaces of the guide projections 38 and 39 respectively as the blade holder is pivoted, in use. This helps to guide the pivotal motion of the holder 12. The upstanding guide projections 42 and 43 are received in the openings 55 and 54 respectively on assembly. With the blade holder in its normally outwardly biased position relative to the body part 11, the end of the projection 39 adjacent the longitudinal center line of the part 11 acts as a stop to engage the unrecessed side of the main body portion 12a of the holder 12. Additionally/alternately an exterior step on the end surface of the holder 12 can engage an interior step at the free end of wall 18 to act as a stop.

Figure 9:
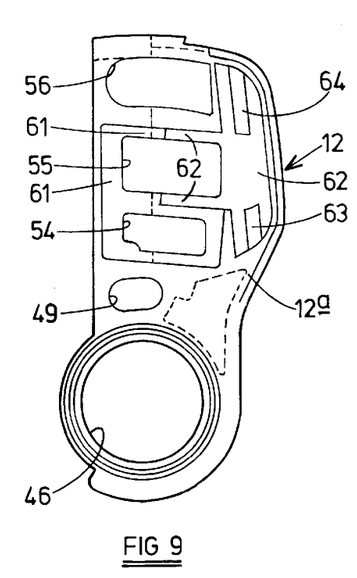
Figure 10:
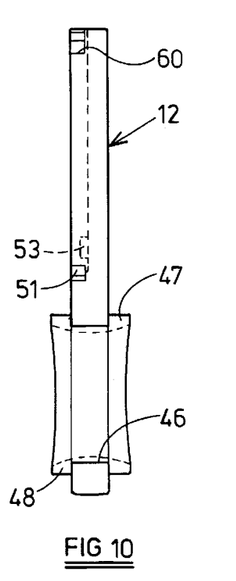
Figure 11:
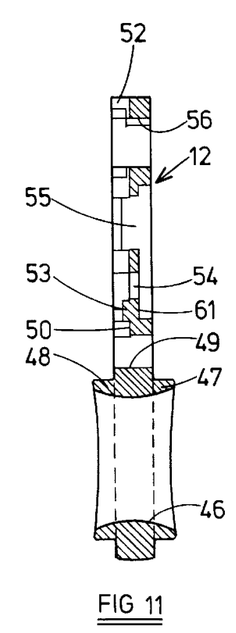
FIG. 11 is a cross-sectional view on line 11—11 of FIG. 8, FIGS. 12 and 13 are reduced scale perspective views of the cutting blade holder showing the faces of FIGS. 8 and 9 respectively.
Figure 12:
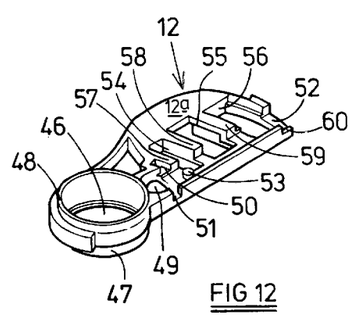
Figure 13:
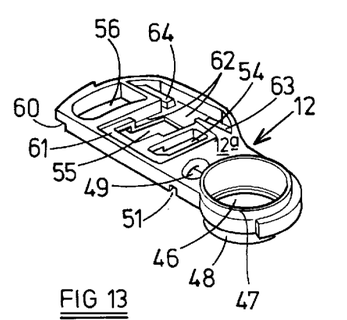

With regard to FIG. 9, showing the opposite side of the main body portion 12a, it can be seen that the area containing the openings 54 and 55 is recessed to two basically different levels. Adjacent the unrecessed straight side, shown at the left in FIG. 9, the area at the ends of the holes is recessed to a first level denoted by the numeral 61. This level basically extends along the side of the opening 54 adjacent the slot 49 and also extends between the openings 54 and 55, as for example shown in FIG. 13. However the remainder of the area around the opening 55 is recessed to a second level denoted by the numeral 62. The surface extending along the ends of all three openings 54, 55 and 56 remote from the unrecessed straight side of the holder 12 is mostly at the level 62, but at opposite ends of this area, namely at the ends of the openings 54 and 56, are respective elongate projections 63, 64, the respective upper surfaces of which are at the level 61. The respective inner sides of these projections may be serrated.

The relationship between the body part 10 and the holder 12, on assembly, is such that the upstanding guide projections 23 and 24 are received in the openings 56 and 55 respectively while, if provided, the guide projection at the hole 22 is received in the opening 54, these extending to lie flush at the unrecessed part of the surface shown in FIG. 8. These guide projections can act as stops if, under the spring bias, it is possible to push the blade holder 12 sufficiently far into the body against such spring bias. The projections act as guides to assist in the pivoting of the blade holder into the body of the hand tool.

As described, it will be possible to operate the assembled hand tool as a wire cutter/stripper since the assembly comprising the biased blade holder and associated blade are pivotally mounted in the body formed by the first and second body portions 10 and 11. However in this first embodiment of the invention there is provided a preferable feature in the form of means for adjusting the depth of cut of the blade into a cable or conductor sleeve. This adjustment is effected by means of the anvil member 15 and slidable operating button 16 which will thus now be described.

The anvil member 15 is shown in FIGS. 14 to 17 and is used effectively to shield different portions of the cutting edge of the blade so as to reduce the depth of cut for different types of cable. The anvil member basically comprises a main flat plate 65 of generally rectangular form, with various slots therein and appendages on its opposite sides, although the component would normally be formed integrally in one piece. For the purposes of description, the side 66 of the plate shown in FIG. 17 will be referred to as its rear face, with its opposite side 67 shown in FIG. 15 being referred to as its front face. As will be explained, this anvil member is fitted into the slots and recesses of the face of the blade holder 12 shown in FIG. 9 with its front face facing and engaging against the interior surface of the body part 10, the exterior surface of which will bear indicia, wording or other information relevant to the operation of the hand tool, and will thus normally be considered to be the front surface of the hand tool at which the adjustment for the depth of cut will be made.

The plate 65 has two generally rectangular openings therethrough the longer of these being denoted by the numeral 68 and the shorter by the numeral 69. When assembled in the blade holder 12, these openings are aligned with the openings 55 and 54 respectively although being of shorter extent. Moreover, on assembly, the guide projection 24 extends through the longer opening 68, and the projection, if provided, at the hole 22 will extend through the shorter opening 69, to assist guidance of the anvil member during its adjustment movement.

Figure 14:
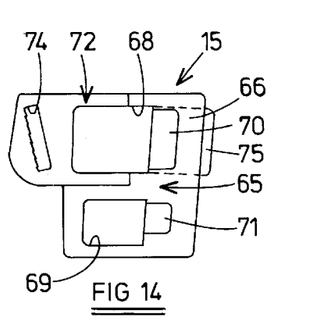
FIGS. 14 to 16 are opposite plan views and a side view respectively of an anvil member of the hand tool.
Figure 15:
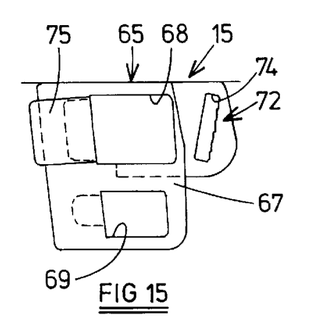
Figure 16:
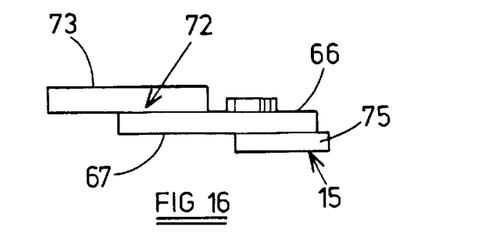
Figure 17:
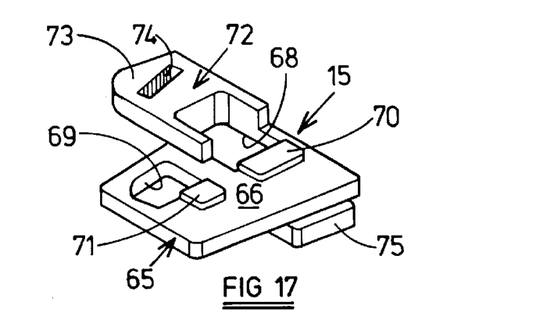
FIG. 17 is a perspective view of the anvil member.
Figure 18:
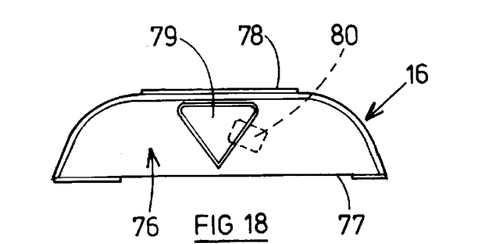
FIGS. 18 to 21 are top and underneath plan views, a rear view and an end view respectively of an operating member for adjusting depth of cut.
Figure 31:
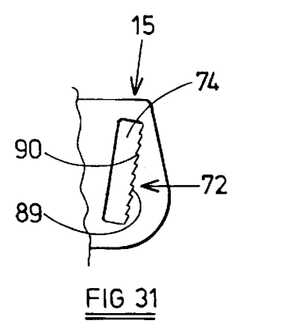
FIG. 31 is a detailed scrap view of part of the anvil member of FIGS. 14 to 16.

As shown best in FIGS. 14 and 17, the rear face of the plate is provided at the respective co-linear ends of the openings 68, 69 which are away from the periphery of the plate, with short upstanding projections/blocks 70, 71 respectively which are sized to be received in the openings 55, 54 respectively at the end of said openings at which the recess is at the level denoted by the numeral 61, so that the areas of the rear face of the plate 65 at opposite sides of the blocks can slide on the bottom of the recess formed at level 61. Also formed on this rear face of the plate 65 is a block 72 which is formed with legs partly surrounding the opposite longer sides of opening 68. A main portion 73 of block 72 extends from said legs beyond the periphery of the plate 65 to form a nose part in which there is an angled through slot 74. This block 72, comprising said legs and said main portion 73, is received in the recess which defines the level 62, the legs being slidable in the part of the level 62 at opposite sides of the opening 55, as shown in FIG. 9, with a nose part being received and slidable within the level 62 immediately adjacent the end of the opening 55 and disposed between the projections 63 and 64. The slot 74 is shown in detail in FIG. 31, the outer side 89 of the slot being shown with serrations/teeth 90.

It will thus be appreciated that with the blocks 70, 71 received in the openings 55 and 54 respectively, and with the block 72 received in the recess which defines level 62, the anvil can slide backwards and forwards in the blade holder 12 to allow a greater or lesser amount of the sharpened edge of the blade 14 to be seen through the openings 55, 54 and thus also through the holes 21, 22 in the front surface of the body part 10. As will be appreciated the co-linearly aligned flat faces of the blocks 70, 71 at the openings are parallel to the cutting edge of the blade. In this way, as will be described, a greater or lesser amount of blade is available to cut through a cable/sleeve before there is contact with the anvil member, so that the depth of cut can be adjusted in this way. It will be appreciated that it will be the respective ends of the openings 68, 69 adjacent the blocks 70, 71 which act as stops or anvils to engage the cable or cable sleeve at the termination of the allowed cutting by the blade.

On the front face 67 of the plate 65, substantially underneath the block 70, there is a further block 75 which extends rearwardly slightly beyond the periphery of the plate 65. This block is, on assembly, received in the recess 25 in the first body part 10, the depth of the block 75 being equal to the depth of said recess 25 so that the remainder of the front face engages against and slides upon the unrecessed inner surface of the body part 10, except for the part over recess 27, if present.

The slidable operating button 16 shown in FIGS. 18 to 22 is for controlling the forwards and backwards sliding of the anvil member 15, and this operating button 16 will now be described.

Figure 19:
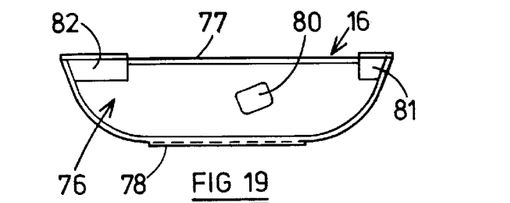

The main part of the button 16 is a flat main body part 76 which, in plan, is generally rectangular with arcuate opposite ends so as to define, for the body part 76, a straight longer side 77 and an opposite straight shorter side 78. The thickness of the main body part 76 is substantially equal to the depth of the recessed part of the blade holder 12 defined between the outwardly facing surfaces of the projections 63, 64 and the plane of the unrecessed surface of the holder 12 shown in FIG. 9. Accordingly the undersurface of the main body part 76, as shown in FIG. 19, slides, upon assembly and in use, on the projections 63, 64 as the button is adjusted, as will be described. Short projections, not shown, can be formed on side 78, so as to allow button 16 snap-fittingly to engage slidingly with holder 12.

On the upper face of the main body part 76 is disposed a central projection 79 in the form of an arrow head which has its base adjacent the shorter side 78 and its point adjacent the longer side 77. At side 78, the projection can have an upstanding grip part. The height of the arrow head projection substantially corresponds to the depth of the recess 26 in the first body part 10 so that the projection 79 can slide in the recess as the cutting blade holder 12 is pivotally moved into the body of the hand tool, in use.

Figure 20:
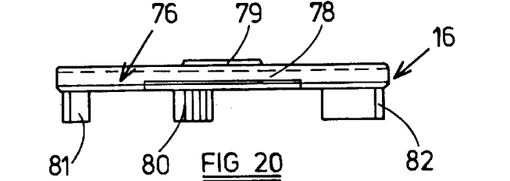
Figure 21:
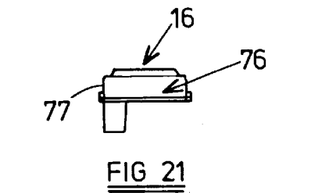
Figure 22:
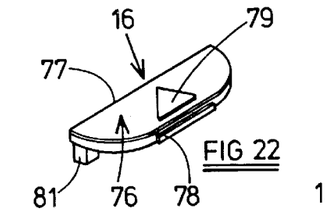
FIG. 22 is a top perspective view of the operating member.
Figure 32:
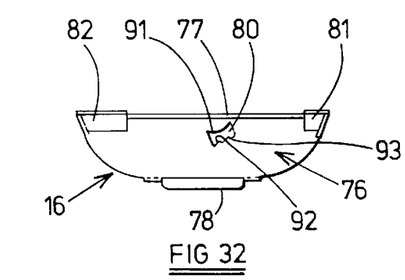
FIG. 32 is a view corresponding to FIG. 19 showing an alternative form of operating member.
Figure 33:
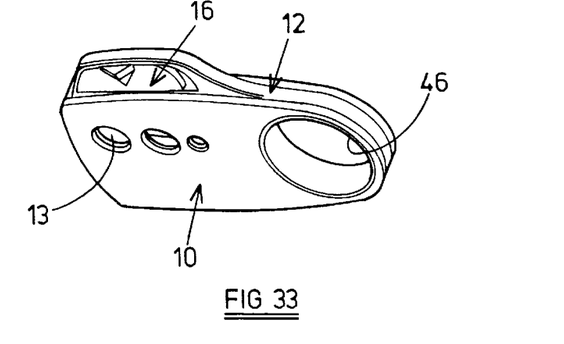
FIG. 33 is a perspective assembled view of the hand tool.

On its underside, the main body part 76 has, at a position substantially centrally between its sides 77 and 78 a depending rectangular projection 80, which is at an angle of approximately 22° to said side 77. As shown in FIG. 20, the outwardly facing sides in use, of the projection is serrated, matching the serrations of slot 74. This projection extends from the undersurface of the part 76 by an amount so that it can extend through the slot 74 in the anvil member and reach or substantially reach the level denoted by the numeral 62 in the one side of the blade holder 12. The fit of the projection 80 in the slot 74 is such that as the button is slidably moved, the projection engages the sides of the angled slot 74 so as to move the anvil member linearly inwards or outwards relative to the cutting blade 13 which is held in the blade holder 12 as described. An alternative form of projection 80 is shown in FIG. 32, where the inwardly facing side 91 of the projection is concave. The serrations 92 on outwardly facing surface 93 can form a ratchet with the teeth of slot 74.

To assist guiding of the button 16 in the recess having the level 62, opposite ends of the button at the longer side 77 are provided on the undersurface with depending guide legs 81, 82, as shown in FIG. 20, respectively having the same depth as the projection 80. These legs are generally rectangular and parallel to the sides 77 and 78, so as to fit closely, in use, in the guideways defined behind the projections 63, 64 at the sides thereof away from the openings 54 to 56. Thus these legs engage against the respective sides of these guideways so that the button is tightly guided as it is slid from one end to the other of this recessed part 62.

Figure 25:
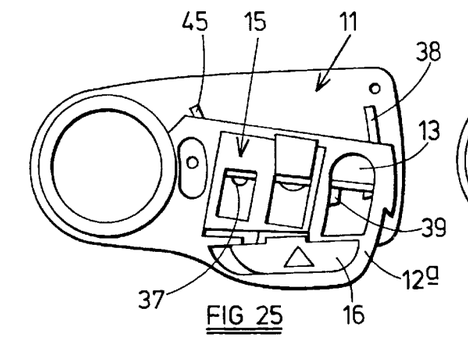
FIGS. 25 and 26 are views corresponding to FIGS. 23 and 24 respectively, but in the opposite direction and with the body part of FIGS. 1 to 4 removed instead of the body part of FIGS. 5 to 7.

With the blade holder 12 pivotally mounted to the body as described, the blade spring 14, or as described, a pair of such springs, are fitted into the body part 10 generally as shown in FIG. 23 with the bent leg portion 34 of the or each spring being received in the undercut 33, the leg of each spring extending between the wall 19 and the extension part 32 with the end or ends of the spring or springs engaging against the flat unrecessed exterior side of the main body portion 12*a* of the holder 12 so as normally to bias the holder in a direction outwardly of the body as shown in FIG. 23 and also in FIG. 25, FIG. 23 showing the holder engaged with the body part 10 and FIG. 25 showing the holder engaged with the body part 11. In the position shown in FIG. 23, the holder is prevented from further outwards movement by, for example, an end part of the holder remote from its hole 46 engaging with the wall 18 as well as the inner ends of the openings 68 and 69 engaging with the associated upstanding projections at the openings 21 and 22 if both are provided. With FIG. 25, the projection 39 can act as a stop to engage against the inside of the flat unrecessed wall of the part 12*a* as previously described. All three projections 38, 39, and 45 can act as stops to engage the part 12*a* to restrict inwards movement of the holder 12 in the opposite direction against the spring bias, although in view of the spring bias, this extreme inward position may not be attainable. As far as stops on the body part 10 are concerned, these, as shown in FIG. 24, can be the spring itself which in turn engages against the body part 10, as well as the upstanding projections at the openings 20, 21 and 22.

Operation and Use of Hand Tool

Having described above the construction and interrelationship of the various component parts of a first embodiment of a hand tool of the invention, it is believed that operation of the tool, in use, in its assembled form will be understood in conjunction with the brief description which is now given below.

As mentioned above, the exterior face of the body part 10 is considered to be the front of the hand tool, and again as mentioned, this will bear indicia and wording relating to the operation of the device. The opening 20, is for the insertion into and through the tool body of a cable, which can be single or multi-core, with the core being of any particular form. Upon subsequent operation of the tool, as will be described, cable inserted through this opening 20, and extending through its associated aligned opening 35 will be cut through, i.e. severed, so as to separate the cable into two parts. The central opening 21 is for trimming and/or stripping the sleeve or outer plastics cover of such a type of cable mentioned, and again the opening is relatively large to permit insertion of this type of cable. However it could be used for a single or multi-core cable of smaller diameter. While the depth of cut adjustment effect by way of the button 16 and anvil member 15 is not effective in relation to cable inserted into the body through the opening 20, such adjustment can be effected in relation to the cut produced in the cable inserted into the body through the opening 21. As mentioned, it is not intended that cable inserted through the opening 21 is severed, but merely that the outer sheath of the cable, or the sleeve of an individual conductor is cut so that it an be removed by stripping it, from that which it surrounds, in the normal manner.

Finally the smallest opening 22 is for stripping an insulating or other sleeve from an individual conductor and is thus primarily intended for use with individual sleeved conducting wires, i.e. cores of a single or multi-core cable. Again the depth of cut adjustment is actuable at this opening. As before, the cable can be inserted into the holes described and passed through the body by way of the aligned holes respectively in the body part 11, but even if the cable or core is not fully inserted through the body, the openings in the body part 11 are still desirable to allow the stripped sleeve or insulation to fall or to be removed from the body, generally automatically on completion of the stripping operation.

However the holes for cable reception need not extend completely through the body.

In accordance with the above, indicia/pictures illustrating the intended use of each of the three openings would normally be provided on the front surface of the body part 10. Moreover adjacent the position of the operating button 16 at the 'bottom' of the front surface of body part 10 the two extreme positions of adjustment of the anvil member would be illustrated by an indication as to where the tip of the arrow head projection 79 should be disposed, one position, corresponding to the button being at one end of its allowed movement, corresponding to a cut depth, for example, for three-core cable, and the other position, corresponding to the button being at its other end of its travel, for example, for co-axial cable. This would ensure that in its one extreme position for three core cable, a maximum amount of the cutting edge of the cutting blade would be available to effect the cutting for the stripping operation, while in the other extreme position of the anvil member, corresponding to the intended use with co-axial cable, the anvil would effectively shroud the majority of the sharpened edge of the blade so that there was minimum cutting stroke for stripping of the cable. In some instances the adjustment may be such that only one extreme position or the other can be used, but alternatively it may be possible for the button to be held in any desired position between said two extremes so as to provide a continuously variable degree of selection for the depth of cut. In other words the button might be lockable, effectively by the ratchet, in any adjusted position.

Figure 26:
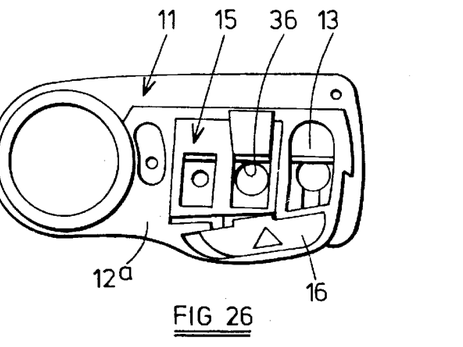
Figure 27:
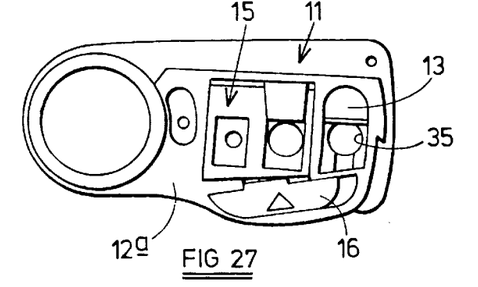
FIG. 27 is a view as in FIG. 26, but with the operating member of FIGS. 18 to 22 adjusted to reduce the depth of cut.

As briefly mentioned above, assembled views of the interior of the hand tool are shown in FIGS. 23 and 24, which has the body part 11 removed, and in FIGS. 25 to 27, which has the body part 10 removed. It can thus be seen that with regard to FIG. 23, in the normal state of the hand tool, the spring bias forces the blade holder to lie partly outside of the hand tool casing. In this position the three openings in the body part 10 are substantially closed by the blade 13, and also the anvil member irrespective of its adjusted position. Thus in this state cable cannot be inserted into any of the three openings 20, 21 or 22. When it is wished to insert cable into one of said openings, an operator, holding the tool by means of the aligned holes 17, 40 and 46, applies pressure, for example by means of a thumb, to the part of the holder 12 protruding from the bottom of the casing and thus pivotally moves the holder inwardly into the body against the spring bias 14. FIG. 24 shows the holder pushed fully into the body so as fully to straighten the spring 14. As previously mentioned, this extreme position is perhaps unlikely in the light of the spring bias, but it will always be possible to push the holder 12 sufficiently into the body so as to uncover all three of the openings 20, 21 and 22, in the manner shown in FIG. 24 so that both the anvil and also the sharpened edge of the blade 13 are clear or substantially clear thereof. With the holder 12 held in this inserted position, the cable or core is then inserted as required into the selected hole, as previously described. The holder 12 is then released and the spring bias will force it outwardly so that the sharpened edge of the blade will engage against the periphery of the inserted cable/core.

To effect cutting, it is intended that it is then necessary to effect relative rotational movement between the inserted cable/core and the cutting blade 13, and this is normally carried out by holding the cable stationary and rotating the hand tool therearound. Alternatively, of course, in some instances it may possibly be more convenient to hold the hand tool stationary and rotate the cable or core. In any event as the relative rotation takes place an annular cut will be formed in the outer periphery of the core, this cut extending further inwards as the rotation is continued, under the pressure of the blade spring which forces the cutting blade down towards the bottom of the hand tool body. For cable inserted through the opening 20, the rotation is continued until the blade cuts completely through the cable, while for the other two openings, the rotation would normally be continued only until the cut is effected through the insulating sleeve which it is wished to strip off from the conducting wire or wires which it encloses. With this arrangement, at the end of the rotation process, it is merely necessary to pull the cable/core away from the front surface of the tool, which will result in the sleeve at the opposite side of the blade being stripped from the conductor as it is removed from the hand tool. As mentioned this can then merely fall out through the aligned opening in the body part 11. The pulling out may require some twisting of the cable. It has in fact been found that with the small opening 22, for stripping individual single cores, the pulling out may in itself both effect the stripping of the outer sleeve and also effect twisting together of the very thin individual conductor wires previously enclosed by the outer sleeving, this being the type of arrangement with, for example, each core in a domestic three-pin plug. Alternatively the cable can be removed from opening 21 and then bent slightly at the cut mark so that if the depth of cut is sufficient, the outer insulation will break through, and can be removed.

It will be appreciated that the cutting force is supplied by the energy stored in the blade spring when it is deformed. The cutting force thus depends on the strength of the spring. Although normally this force is insufficient to cut the cable either partially or certainly wholly without the relative rotation referred to (which makes the force more effective), the force could be made sufficient so as to make rotation unnecessary, by the use of sufficiently strong spring means.

FIGS. 25 and 26 show in effect the same operation as FIGS. 23 and 24, but without illustrating the blade springs 14. FIG. 25 shows the depth of cut adjusted by means of the button 16 so that the maximum amount of the sharpened cutting edge of the blade 13 is available for cutting in that the anvil is moved away from the front of this sharpened blade surface. The alternative extreme adjusted position is shown in FIG. 27 where the button is at its other extreme end of travel and, for the openings 21 and 22, the anvil shrouds a substantial part of the sharpened edge of the blade. Although shown schematically in FIG. 27 as covering all of the sharpened edge of the blade, the anvil would, in practice, leave at least a small portion uncovered to effect a limited cutting of the inserted core/cable.

It is intended that maximum depth of cut would be used, for example in stripping the outer cable from conventional domestic flex, such as that used with a two or three-pin plug. A reduced depth of cut would normally be used with thinner sleeved cable, for example co-axial cable such as the form used in computer cabling.

Although this first embodiment of the invention has been described as incorporating the depth of cut adjustment means, such means could of course be omitted if required. However this depth of cut adjustment is considered an inventive feature in its own right and thus could be used independently of the other inventive feature or features of this first embodiment, and could be included with or omitted from the second embodiment, to be described.

It has been found with a hand tool according to this first embodiment, that in certain circumstances, with a thin core inserted into the opening 22, the pressure on the core by way of the springs 14 is such that the core tends to flex before it is cut and this can make the cutting operation difficult to effectively carry out. To overcome this possible difficulty, in a second embodiment of the invention pressure relief means are provided for relieving the main spring pressure on the inserted conductor. Without the relief means a single small wire may be gripped so firmly that there is a danger of the cutting blade just clamping on to the wire, and twisting into a kink or knot, as if it were held in pliers and turned. In such a case there would not be the required relative rotation and resultant stripping of the wire.

As described when referring to the opening 22 in body part 10, the associated upstanding guide projection at the one side of the opening 22 can be omitted and instead the described recess 27 provided. In this second embodiment of the invention, there is received in this recess the pressure relief insert 83 shown in FIGS. 28 to 30. This is in the form of an injection molded one piece plastics member having a generally rectangular base 84 which is a tight fit in the recess 27. From FIGS. 28 to 30, it can be seen that from the center of its upper face, a slightly tapering, generally rectangular projection 85 is upstanding, this, in use, extending through openings 69 and 54 to the inner surface of the body part 11, i.e. acting in the same manner as the guide projection it replaces at opening 22. At its side facing one of the narrower ends of the base 84 the projection is recessed to continue upwards the projection of part of a circular hole 86 formed at the foot of the projection through the base 84 as shown best in FIG. 30. It can be seen that on the underside of the base the hole 86 hole is countersunk. The insert 83 fits in the recess 27 so that this hole 86 is over and aligned with the hole 22 for the passage of a thin core as described. In use, part of the inserted cable is received in the recessed part of the projection corresponding in shape to said part of hole 86.

At its other narrower end, the base is formed with a flexible portion 87 formed by a pair of interconnected arms, the portion 87 terminating in a tip 88 which engages the narrower end of the slot 27 adjacent the longer side of the body part 10 which is open.

Accordingly, in operation, the insert in effect acts as a plastics material spring to allow sliding movement of the insert 83 by compression of the flexible portion 87, if required, in order to reduce the 'pinch' on the cable so as to allow cutting to take place as required to enable the stripping of the wire as described.

This pressure relieving insert is itself believed to be inventive alone and or in combination with one or both of the other inventive features described and identified herein.

Instead of the holder 12 being pivotable, it could alternatively be linearly movable relative to the tool body. Moreover the holder 12 could be biased to its release position instead of to its position where the cutting blade obstructs the body openings for cable insertion. Resilient means other than a blade spring could be used to bias the holder 12 to its cable release or cable engagement position. Clearly the anvil member 15 and button 16 could have their angled slot and projection respectively reversed, i.e. the slot being in the button.

What is claimed is:

1. An apparatus for use with a cable, the apparatus comprising:
    a body having an opening to receive the cable;
    a cutting element movable within the body between a first position and a second position, when the cutting element is in the first position, the cutting element does not extend into the opening such that the cable may be displaced into the opening, when the cutting element is displaced into a second position, the cutting element extends into the opening by an adjustable amount such as to engage a cable positioned within the opening; and
    an adjustment device, situated within the body, including a further member and a manually-operable, non-rotatable, slidable member, the adjustment device adjusting the amount that the cutting element extends into the opening when the cutting element is positioned in the second position, wherein:
    the further member, being coupled to the cutting element, secures the cutting element and allows for motion of the cutting element in a direction towards and away from a center of the opening between the first position and the second position, and
    the manually-operable, non-rotatable, slidable member being slidably coupled to the further member such that, when slid, adjusts travel of the further member in the direction, which in turn adjusts the amount that the cutting element extends into the opening when the cutting element is positioned in the second position, thereby adjusting the maximum cut depth into the cable by the cutting element.

2. The apparatus set forth in claim 1, further comprising a blade holding member that includes the manually-operable, non-rotatable, slidable member and the further member.

3. The apparatus set forth in claim 2, wherein as the slidable member is slid, the resultant motion of the cutting element, connected to the further member, is linear.

4. The apparatus set forth in claim 3, wherein motion of the slidable member is constrained by a guideway formed in the blade holding member.

5. The apparatus set forth in claim 3, further comprising a blade holder having a guide and situated within the body such that as said further member slidably moves, in response to motion of the slidable member, the further member is guided, via the guide, within the holder such that motion of the cutting element in a direction transverse to the opening is limited.

6. The apparatus set forth in claim 5 wherein the slidable member has a projection and the further member has a slot, the projection is slidably disposed within the slot such that the slidable member can transversely slide relatively to the opening, the transverse sliding of the slidable member relative to the opening adjusts the amount that the cutting element extends into the opening when the cutting element is positioned in the second position.

7. The apparatus set forth in claim 6, wherein respective engaging surfaces formed in the slot and the projection each have complementary serrations formed thereon.

8. The apparatus set forth in claim 5 wherein the further member has a projection and the slidable member has a slot, the projection is slidably disposed within the slot such that the slidable member can transversely slide relatively to the opening, the transverse sliding of the slidable member relative to the opening adjusts the amount that the cutting element extends into the opening when the cutting element is positioned in the second position.

9. The apparatus set forth in claim 8, wherein respective engaging surfaces formed in the slot and the projection each have complementary serrations formed thereon.

10. The apparatus set forth in claim 1, wherein said further member has a surface that engages a cable when an adjusted maximum possible cut depth has been achieved.

11. The apparatus set forth in claim 1, wherein the slidable member has an indicator indicating a cutting depth of the cutting element.

12. The apparatus set forth in claim 1, wherein the manually-operable, non-rotatable, slidable member comprises a portion externally accessible from a portion of the body and moveable in relation to the body such that the slidable member can be manually operated external of the body.

13. The apparatus set forth in claim 1, wherein the body has a second opening to receive a cable, sliding of the manually-operable, non-rotatable, slidable member does not adjust the amount that the cutting element extends into the second opening when the cutting element is positioned in the second position.

14. The apparatus set forth in claim 1, wherein the body has a second opening to receive a cable, sliding of the manually-operable, non-rotatable, slidable member does adjust the amount that the cutting element extends into the second opening when the cutting element is positioned in the second position.

15. The apparatus set forth in claim 1, wherein the cutting element is biased into the second position.

16. The apparatus set forth in claim 15, further comprising:
    a holder that holds the cutting element;
    a resilient member; and
    the cutting element is carried by the holder wherein the resilient member biases the holder such that the cutting element is biased from the first position into the second position.

17. The apparatus set forth in claim 15, further comprising stops for limiting travel of the cutting element wherein the cutting element does not fully extend through the opening when the cutting element is positioned in said second position.

18. The apparatus set forth in claim 15, wherein the holder is pivotably mounted within the body.

19. The apparatus set forth in claim 1, further comprising a blade spring, wherein when said cutting element is in the second position, a biasing force exerted by the blade spring is applied to the cutting element which acts to retain the cable within the opening.

20. An apparatus for use with a cable, the apparatus comprising:
- a body having an opening to receive a cable;
- a cutting element movable within the body between a first position where the cutting element is clear of the opening to allow reception of the cable into the opening, and a second position;
- a biasing device located within the body and secured to the body so as to apply a biasing force against the cutting element, such that when the cutting element is in the second position, in which the cutting element is capable of engaging the cable received in the opening, a cutting force is applied from the cutting element onto the cable such that relative angular movement between the cable received in the opening and the cutting element engaging the cable effects cutting of the cable; and
- a cutting force relief device, contained within the body, which engages with the cable and limits the biasing force applied from the biasing device upon the cutting element such that the cutting force applied to the cable is relieved.

21. The apparatus set forth in claim 20, wherein the cutting force relief device includes a flexible portion that is arranged to be displaced as a result of excessive force applied to the cutting element.

22. The apparatus set forth in claim 21, wherein said flexible portion includes an upstanding cable guide that engages an exterior surface of the cable received in said opening.

23. An apparatus for use with a cable, the apparatus comprising:
- a body having a body opening to receive the cable; and
- a cutting element movable within an interior space defined within the body between a first position, in which the cutting element is clear of the body opening to allow for reception of the cable into the opening, and a second position towards which the cutting element is biased, when the cutting element is in the second position it is capable of contacting the cable, wherein the body includes:
  - a blade holder contained in the body and configured to carry the cutting element, a holder opening situated in the blade holder,
  - a first part of the body and having a first interior surface,
  - a second part of the body and having a second interior surface, the first and second parts being secured together such that the first and second interior surfaces of the first and second parts together define said interior space within which the blade holder is displaceable,
  - a first aligned aperture extending through the first body part,
  - a second aligned aperture extending through the second body part, the first aligned aperture and the second aligned aperture together defining said body opening, the body opening is configured such that when the cutting element is in the first position the cable can be inserted into the body opening and the holder opening, and when the cutting element is in the second position, the cutting element and the body opening are configured to engage the cable, and
  - a cable guide projecting from the first interior surface of the first part towards the second interior surface of the second part such that, when the cutting element is in the second position, the the cable inserted through the body opening is engaged between the cable guide and the cutting element.

24. The apparatus set forth in claim 23, wherein said first and second body parts have a plurality of said pairs of aligned apertures extending therethrough, and said blade holder has a corresponding number of alignable slots therethrough, the blade holder being biased into a rest position wherein an edge of said cutting element extends into said apertures, wherein the edge of the cutting element engages the cable guide, and is positioned such that the edge of the cutting element is configured to engage a cable inserted into any one of the apertures.

25. The apparatus set forth in claim 24, wherein the blade holder is moveable relative to the body so as to place the cutting element in the first position which brings a portion of each of the alignable slots remote from the edge of the cutting element into contact the the cable guides.

26. The apparatus set forth in claim 23, wherein the cable guide is disposed adjacent to the aligned apertures, and the surface of the cable guide facing said apertures is arcuate in configuration to engage the exterior surface of the cable.

27. The apparatus set forth in claim 23, wherein, when the cutting element is in the second position, rotational movement of the apparatus relative to the cable received in the opening effects cutting of the cable.

* * * * *